United States Patent [19]
Stein

[11] Patent Number: 5,532,874
[45] Date of Patent: Jul. 2, 1996

[54] MULTISCANNING CONFOCAL MICROSCOPY

[75] Inventor: Alfred Stein, Toronto, Canada

[73] Assignee: Morphometrix Inc., Toronto, Canada

[21] Appl. No.: 166,881

[22] Filed: Dec. 15, 1993

[30] Foreign Application Priority Data

Dec. 18, 1992 [GB] United Kingdom ............... 9226430

[51] Int. Cl.$^6$ ................ G02B 21/26; G02B 21/00
[52] U.S. Cl. .............. 359/394; 359/368; 359/383; 359/391
[58] Field of Search ............ 359/368, 373–379, 359/382, 383, 384, 385, 388, 390–394; 250/201.3–201.5; 356/139, 142, 144

[56] References Cited

U.S. PATENT DOCUMENTS

| | | | |
|---|---|---|---|
| 5,029,996 | 7/1991 | Carter | 359/394 |
| 5,103,338 | 4/1992 | Crowley et al. | 359/394 |
| 5,132,526 | 7/1992 | Iwasaki | 359/368 |
| 5,212,580 | 5/1993 | Coad et al. | 359/391 |

*Primary Examiner*—Thong Q. Nguyen
*Attorney, Agent, or Firm*—Ridout & Maybee

[57] ABSTRACT

A confocal microscope system has a turntable with object locations for mounting multiple samples to be examined in a ring. The turntable is rotated about an axis concentric with the ring. At least one confocal microscope optical system is mounted with components movable axially and radially relative to the ring so that an object region may be scanned through samples mounted in the object locations, each microscope system including a point image detector providing a signal output, and a demultiplexer for receiving the signal output and isolating signal segments associated with different sample locations, and a multiple channel signal processor processes the signals associated with different locations, and a control unit moves axially movable components of each optical system firstly to establish focus reference data for each object and then to control the focus of the microscope responsive to the focus reference data as it scans successive object locations.

13 Claims, 3 Drawing Sheets

MULTISCANNING CONFOCAL MICROSCOPY

BACKGROUND OF THE INVENTION

1. FIELD OF THE INVENTION

This system relates to process microscopy, and more specifically to a confocal microscope system suitable for the microscopic examination of large numbers of objects, for example microscope slides, in applications such as automated histological analysis, morphometry, inspections of semiconductor wafers and micromachined components, and other applications involving the inspection or analysis of animate or inanimate objects of very small dimensions.

2. REVIEW OF THE ART

Scanning microscopes are well known in the microscopy art and confocal microscopes in particular are capable of providing enhanced resolution and the capability of three dimensional imaging of objects, utilizing the ability of such microscopes to reject image data other than that from the particular focal plane being scanned.

A disadvantage of such microscopes is the considerable time generally needed to complete a scan of an object, which reduces the usefulness of the technology in process microscopy, where substantial numbers of objects require to be imaged.

Attempts have been made to improve the speed of confocal microscopy by utilizing multiple aperture scanning disks, such as Nipkow disks, but such rotating scanning disks increase the complication of the basically simple confocal microscope system, and are in general highly inefficient optically, which may again require a trade-off between resolution and speed.

The principles of confocal microscopy were disclosed in U.S. Pat. No. 3,013,467 (Minsky), and are described in considerably more detail in the book "Confocal Microscopy" edited by T. Wilson, Academic Press, 1990.

SUMMARY OF THE INVENTION

The present invention seeks to provide substantial improvements in the overall rate in which objects can be imaged or analyzed utilizing a scanning microscope, in process microscopy, without incurring penalties in the resolution and contrast ratio of the images obtained, and whilst providing efficient application of available computational power to the processing of data generated by the system. The system is applicable to the production of two and three dimensional images of objects in the form of slides as well as in vitro and in vivo organisms.

According to the invention, a microscope system comprises a turntable having multiple locations for mounting multiple objects to be examined in a ring, means for rotating the turntable about an axis concentric with the ring, and at least one scanning microscope mounted for radial movement relative to the turntable such that its focal point scans the object locations as the turntable rotates, and means for separately collecting data related to objects in each object location.

SHORT DESCRIPTION OF THE DRAWINGS

FIGS. 1A and 1B diagrammatically illustrate basic configurations of reflective and transmissive confocal microscope configurations;

FIG. 2 diagrammatically illustrates fundamentals of the system of the invention;

Figure 5:
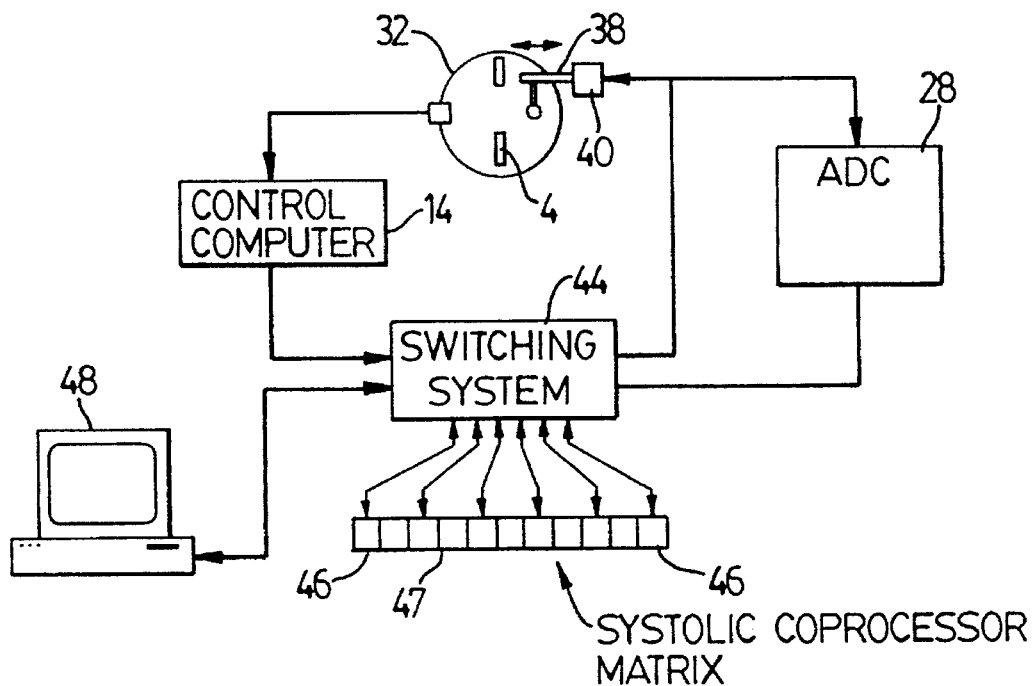
Figure 6:
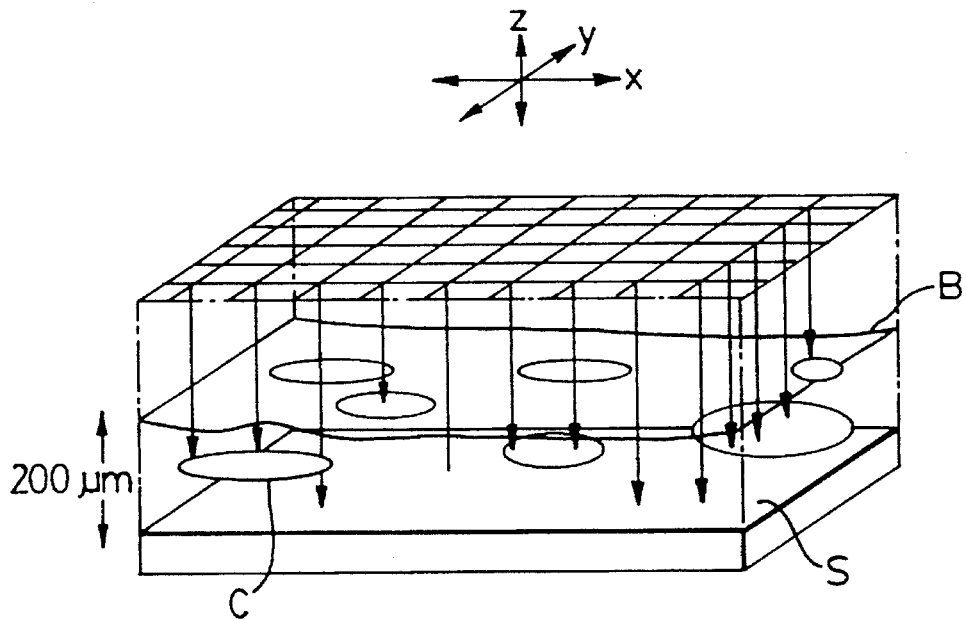

FIG. 5 diagrammatically illustrates further components associated with the control computer; and FIG. 6 is a diagrammatic isometric view of a small portion of a microscope slide, to which reference is made to illustrate certain aspects of the functioning of the invention.

DESCRIPTION OF THE PREFERRED EMBODIMENT

Figure 1A:
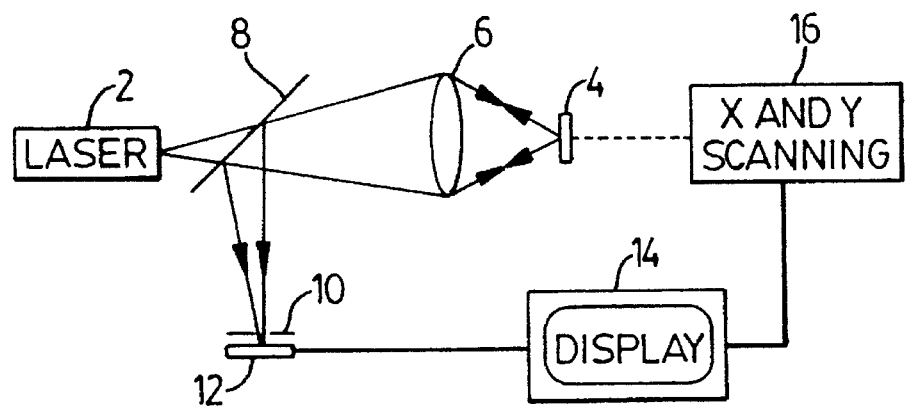

FIG. 1A illustrates a known confocal microscope configuration. A light source 2, typically a laser for providing a continuous high intensity light source of a visible or invisible (ultraviolet or infrared) radiation, appropriate to the type of imaging or examination being carried out, provides a point source of light which is focused upon a point on an object 4 by means of an objective lens 6. Light reflected from the object is collected by the lens 6 and intercepted by a half-silvered mirror 8 which diverts it so that it is focused on a detector comprising a mask 10 defining a pin hole in front of a photodetector 12. The output from the photodetector 12 is passed to a computing and display device 14, which also controls an X and Y scanning device 16 which moves the object 4 in two dimensions relative to the focus of the lens 6.

Figure 1B:
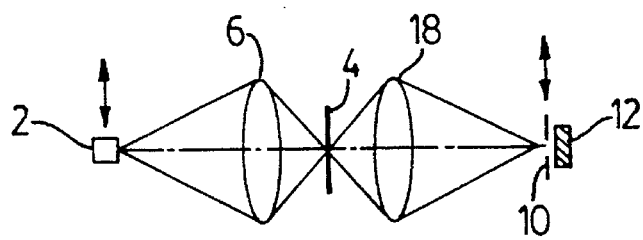

FIG. 1B illustrates how a basically similar arrangement may be utilized for the examination of an object 4 by transmitted light. Here the half-silvered mirror 8 is omitted, and replaced by a further collector lens 18 between the object 4 and the photodetector 12. In this case, both the source 2 and the mask 10 are moved to provide scanning in two dimensions.

Figure 2:
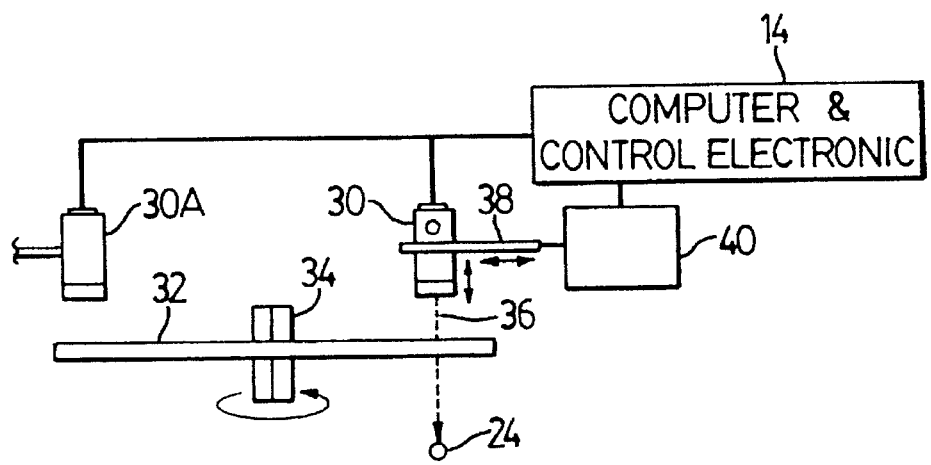

Referring now to FIG. 2, a light source 24 is shown to illustrate that the principles of the present invention may be employed in a system in which the microscope operates in transmissive mode, but all further description will assume that the microscope operates in reflective mode.

Figure 3:
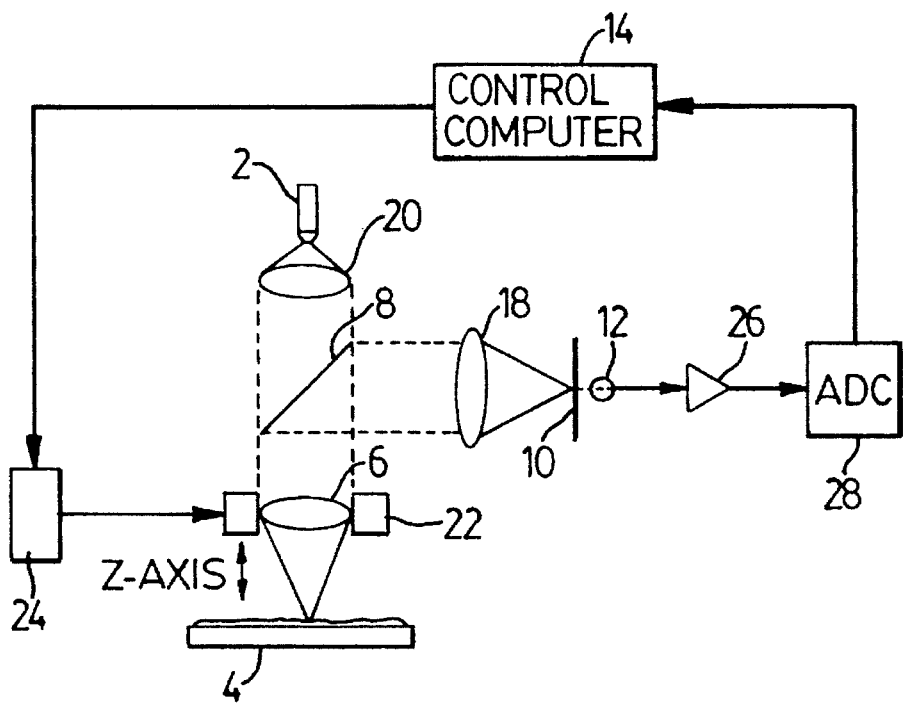
FIG. 3 illustrates diagrammatically a preferred optical configuration of the system of the invention.

The optical configuration utilized in a preferred embodiment is shown in FIG. 3. The light source 2 is associated with a collimating lens 20 which projects a parallel beam through the half-silvered mirror 8 onto the lens 6, which in turn focuses the light at a point in or on the surface of a slide 4 forming the object. The focus of the lens 6 is controlled by a focusing device 22, typically a piezoelectric crystal or voice coil 22 under open or closed loop control of a driver 24 which in turn receives instructions from a computer and control system 14. The collector lens 18 focuses light reflected from the object and intercepted by the mirror 8 onto the aperture of the pin hole mask 10, behind which the photodetector 12 (which may be a photomultiplier if required) generates an electrical signal proportional to the intensity of the incident light, which signal is passed to a preamplifier 26 and thence via an analog to digital convertor (ADC) 28 to the computer 14. Conveniently, all of the optical components, including the light source, the focus coil and the photodetector, are mounted in a common housing 30 (see FIGS. 2 and 4).

Figure 4:
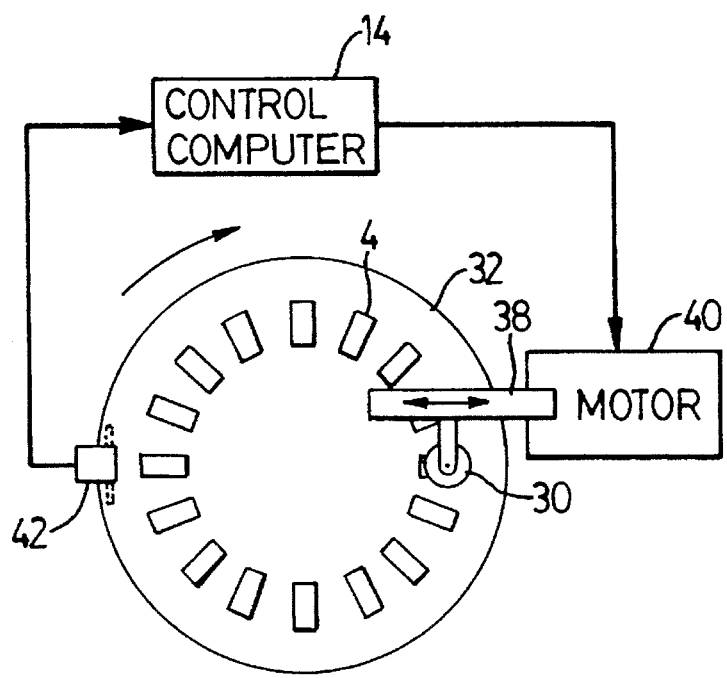
FIG. 4 is a diagrammatic plan view of an embodiment of the invention.

Referring to FIGS. 2 and 4, the slide 4 or other object is one of a substantial number, for example 72 although it may be less or more, mounted in a ring on a turntable 32 rotatable by a motor 34 at a constant rate about an axis parallel to the optical axis 36 of the lens 6. The housing 30 is mounted on an arm 38, driven for radial movement relative to the turntable 32 by a stepping motor 40 controlled by the computer 14. A scanning head 42, connected to the computer 14, scans the periphery of the turntable 32 as it rotates, for data providing the computer with the exact rotational position of the turntable, as described in more detail below.

The motor 40 provides two rates of advance of the arm 38 and hence the microscope housing 30 radially across the annular zone of the turntable in which the objects 4 are mounted. These modes, here in turn "coarse" and "fine" are both related to rotation of the disk such that each rotation causes the arm 38 to move incrementally along a radius of the turntable. The coarse increments are a multiple of the fine increments, so that, for example, if the fine increments are 1 micron, the coarse increments may be 20 microns. It follows that, in this example, a succession of fine increments will mean that a traversal of the objects to be scanned will require twenty times as long as would be the case with a coarse scan. The coarse and fine scans are employed respectively during a normalization phase and an imaging phase of the operation of the device, as described further below. The mode of operation of the motor 40 and arm 38, and the technology used, is essentially similar to that employed for moving the recording and/or playback heads of a magnetic or optical disk drive, although the requirements for precise absolute positioning of the head by the stepping mechanism may be less critical.

In a preferred arrangement, positional data for pickup by the head 42 from the disk may be in the form of two regularly spaced tracks, one containing marks corresponding to the ones, and the other consisting of marks corresponding to the zeros, of a maximum length pseudo-random binary sequence, enabling the precise position of the disk at any time during its rotation to be determined by the control computer 14 through a calculation employing the generating function of the particular maximum length sequence inscribed on the disk, as described for example in "Binary Sequences" by G. Hoffman de Visme, English Universities Press, or "Shift Register Sequences" by J. Golomb, Van Nostrand.

As the turntable 32 rotates, the reflectivity of successive large radius arcs of the objects are detected, successive slides or other objects providing signal samples or pixels at the output of the ADC 28 proportional to the relative intensity of the reflected light at a particular point. The signal from the detector is sampled at a rate proportional to the speed of rotation of the disk and sufficient to provide the resolution required for the recognition of detail necessary for the process being performed, having regard for the processing speed of the computer 14 which receives the sampled pulses from the analog-to-digital converter 28. The information derived from the data picked up by the head 42 is employed by a switching unit or demultiplexer 44 (see FIG. 5) associated with the computer 14 to demultiplex data relating to each separate slide and assign it to its own coprocessing system 46 associated with the computer 14. Each of the objects on the turntable has a separate coprocessing system assigned to it. Each coprocessing system will execute an identical program on the particular pixels switched to it from the analog-to-digital converter 28, although it will operate independently, and different subroutines and procedures may be executed by the different coprocessor systems in accordance with the data encountered in the course of their operation. Whilst the coprocessing systems may be implemented by a multi-tasking system, or separate processors, it is preferred that the processing systems are parallel autonomous sections of a single coprocessor unit 47 appropriately segmented for the task. Each of the autonomous sections in the preferred embodiment forms part of a matrix of elementary computers operating in systolic mode, such that all computers in a particular row of the matrix perform the same operation on different data so that a sequence of different operations (as in an assembly line) is performed on a given data item as it travels down a column. This mode of operation, termed "SIMD" or "Single Instruction (per row) Multiple Data (per row)" is known in the art. A suitable systolic coprocessor unit is described in our co-pending U.S. patent application Ser. No. 07/944,924, now abandoned.

The time interval between receipt by a given coprocessor system of an arc or pixels from a slide or other object, and the time when it receives a following arc of pixels from the same slide, is termed its duty cycle, which is equal to the rotational speed of the disk, which in an exemplary embodiment might be 180 rpm, corresponding to the duty cycle of 330 milliseconds. During this period, the data received by each coprocessor may be processed to compress it utilizing known data compression techniques such as run length and/or Huffman encoding, subjected to enhancing techniques if required, and assembled with data from other arcs from the same slide to build up a compressed image. The processing may be such as to facilitate the recognition of anomalies, abnormalities or other distinctive features of the object being examined. Although the time required to examine and analyze data from an individual slide or other object may be lengthy, possibly as long as an hour, the large number of slides being processed simultaneously means that the actual average rate of examination can be quite high. Thus if sixty slides are processed in an hour, the average rate of processing is one a minute. It will also be noted that the arrangement just described entails only quite modest computational requirements for each of the coprocessor systems, even though the total quantity of data being processed may be very large.

It is a feature of confocal microscopy that not only is it capable of excellent resolution in an image plane, but it also provides excellent rejection of data from points displaced on the Z axis relative to that plane. This has two consequences. Firstly, focusing is very critical, and secondly it is possible to image different planes of the same object to provide three dimensional imaging. The control of focus is an important aspect of the present invention.

Each slide, or other object to be examined and located on the turntable, may have variations in thickness and profile due to manufacturing tolerances, as well as much larger variations found in biological slide preparations due to the manner in which samples are placed on a slide. Furthermore, there may be manufacturing inaccuracies in the turntable, and in means provided to locate slides or other objects on the turntable. Since the turntable may be of significant diameter in order to accommodate a large number of objects, and rotated at a substantial velocity, mounting means provided for the objects must be sufficiently robust to locate them securely under these conditions. Furthermore, as is illustrated in FIG. 6, cells C within a biological slide may be at different levels within a sample, and cells on one level may overlay cells located on another level. Confocal microscopy enables precision focusing on any layer, with resolutions in the micron range. In process microscopy, and particularly in the system already described, cells to be examined will be located at different heights above the upper surface of the slide on each slide, while cells at different points along the length and width of the slide may also differ in their height above the top surface of the slides. The slides may also be displaced relative to the optical axis both because of manufacturing tolerances in the slides and in the turntable upon which the slides are mounted. Consequently, there will be continuous variations in the axial position of wanted data as the turntable rotates, requiring means for maintaining and controlling an appropriate focus of the lens 6.

The coarse scanning mode is employed in an initial normalization phase in order to provide focus data which is stored in the computer 14 and utilized to control the focusing means 22 as the disk rotates. Such continuous control of focus is somewhat analogous to that employed in reading optical disks, although, as will be noted, the derivation of the data utilized to control focusing is substantially different.

A focus may be initially established by a manual or automatic procedure utilizing the top surface S (see FIG. 6) of a slide or other object as a reference. To facilitate the procedures to be described, this top surface may be coated with a layer which has a high and known reflectivity at the wavelength of the light source 2. This known high reflectivity will result in an identifiable high level of the signal from the detector 12 when the lens 6 is focused on the slide surface.

As the microscope housing 30 is subjected to coarse stepping across the lane of slides during a normalization phase, an oscillatory waveform is applied to the focusing device such that it moves up and down through a distance of, for example, ±5 microns with respect to a reference level located, for example, one or two microns above the nominal surface level of each slide. The top surfaces of the slides will be areas of maximum reflectance, corresponding to a signal magnitude the value of which has already been stored in the control computer. The incoming signals are thus analyzed for the occurrence of this reflectance value, which can be noted whenever it occurs as a point at which the focus of the lens coincides with the surface of the slide. Using successive scans, the data gathered is used to vary the position of the reference level progressively for the portion of the scan over each side as necessary to find the top surface of the slide. By collecting this data, a map can thus be established of the various slide surfaces. The oscillation technique is sometimes known as "dithering" in the technical literature, and the procedure employed to obtain depth information is somewhat similar but not identical to the process or interactive reconstruction employing geometric probing, a topic discussed in literature relating to robotics, for example by S. Skiena in "Problems in Geometric Probing", Algorithmica, Vol. 4, pages 599–605, 1989. Other data can also be gathered during this period for later reference, such as the upper surface B a sample applied to the slide, and the distribution therein of features such as cells having identifiable reflectivity characteristics. All of this data can be utilized to control the following imaging phase.

Once the positions of the slide surfaces, or some alternative reference surface appropriate to the objects being examined, have been established, the imaging phase utilizing the fine stepping is commenced. The focus of the lens 6 is controlled according to the stored data so as to maintain the focus of the lens 6 at the reference level. If a three dimensional image is required, multiple scans may be utilized at displacements from the reference level which may be selected on the basis of other data collected during the normalization phase so as to image features of interest.

In carrying out the coarse scan, the permissible coarseness will depend upon the application. For example, in biological slides, variations in thickness are typically negligible over lateral distances between 30 and 60 microns, whilst in most instances of practical interest in pathology and histology, cells found in such slides have a flattened thickness of between 3 and 8 microns. The relevant data relating to each slide as determined during the coarse scan is stored in the processor system associated with that slide, and is utilized to control the focusing, i.e. the position on the Z axis of the lens 6, as it passes over that slide during successive scans.

The data stored by each processor system in relation to its associated slide may thereafter be utilized to construct two or three dimensional images on an imaging system 48 for subsequent human assessment, or may be processed utilizing pattern recognition or other algorithms to recognize normal or abnormal features of each object, for example abnormal cells in a biological sample.

Whilst the embodiment described utilizes a single microscope in the microscope housing 30, it may be advantageous to provide 2, 3 or more similar microscopes (such as microscope 30A in FIG. 2) distributed around the periphery of the turntable, in order to improve the scanning rate of the apparatus. Incorporation of such multiple microscopes in the system should not influence the resolution and performance obtained, and whilst they will influence the duty cycle by reducing the time available for each processor system to process the data associated with a scan of its associated slide, the time available should remain ample with any reasonable number of microscopes. Accordingly, the speed of the apparatus may be increased within reason simply by multiplying the number of microscopes utilized.

I claim:

1. A confocal microscope system comprising a turntable having locations for mounting multiple objects to be examined in a ring thereon, a motor for rotating the turntable about an axis concentric with the ring, a microscope optical system mounted for radial movement relative to the turntable such that a focus of an objective thereof is scanned over successive objects mounted in said locations, the microscope optical system including a point image detector for providing a signal output, an actuator for effecting radial movement of the optical system, and an actuator for adjusting the focus of the objective in an axial direction relative to the turntable, and a signal processor for receiving said signal output and for separately processing portions of said signal output generated as the objective is scanned over each successive object.

2. A system according to claim 1, including a control computer for controlling the actuator to radially move the optical system incrementally for each rotation of the turntable.

3. A system according to claim 1, wherein the signal processor includes a coprocessor system for signals associated with each object.

4. A system according to claim 3, wherein the coprocessor systems are portions of a matrix of elementary processors operating in systolic mode.

5. A system according to claim 4, wherein the focusing actuator is selected from a group consisting of voice coil and a piezoelectric element.

6. A system according to claim 1, wherein the turntable carries a ring of encoded markings related to the positions of the multiple objects, including a pickup device for sensing said markings and connected to the signal processor to enable the latter to identify portions of the signal output associated with different objects.

7. A system according to claim 1, including a control computer for controlling said actuator for radially moving the microscope and focusing said objective in two phases, a normalization phase in which the focusing actuator is controlled during scanning to vary the focus of the objective, and data accumulated by the signal processor is analyzed to determine an axial position of a recognizable reference plane associated with each object so as to gather further data mapping said plane for each object, and an imaging phase in which said focusing actuator is controlled to maintain the focus of said objective in a predetermined relationship to the plane mapped during the normalization phase.

8. A system according to claim 7, in which the actuator is operable to alter, during the imaging phase, the relation of the focus of the objective to the reference plane to provide three dimensional data.

9. A system according to claim 1, including a plurality of microscopes distributed around a periphery of the turntable.

10. A confocal microscope system comprising a turntable having sample locations for mounting in a ring multiple samples to be examined, a motor for rotating the turntable about an axis concentric with the ring, and at least one confocal microscope optical system having components mounted for movement in respectively radial and axial directions relative to the turntable such that a focus of the microscope can be scanned through samples mounted in said sample locations, each confocal microscope system including a point image detector for providing a signal output, a demultiplexer for receiving said signal output and isolating signals associated with different sample locations, and a signal processor having multiple channels for separately receiving and processing said signals associated with different sample locations, means for radially moving said radially movable components to scan said sample locations, and means for controlling said axially movable components to control the focus of said microscope firstly to establish focus reference data for each object and secondly to control the focus of said microscope responsive to said focus reference data.

11. A method of process microscopy, comprising the steps of: mounting a plurality of objects to be examined or analyzed on a turntable; rotating the turntable relative to a confocal microscope whilst moving the latter radially relative to the turntable, whereby to provide scanning of said objects in two dimensions; segmenting data output from said microscope to segregate data associated with each object; and separately processing said segregated data for each object, to provide image data, including controlling in an axial direction a focus of said microscope during rotation of said turntable during two successive scanning phases, including a first phase in which the microscope is moved radially in relatively course increments and the focus of the microscope is varied systematically in an axial direction during scanning, data from the microscope relating to each object is processed to determine axial focus locations where the signal indicates coincidence of focus with a layer providing a recognizable signal or response and thus to map said layer, and a second phase in which the focus of the microscope is controlled so as to maintain a predetermined relationship to the position of the layer as mapped during the first phase.

12. A method according to claim 11, wherein the second phase is repeated for different relationships between the focus of the microscope and the position of said layer, whereby to develop three dimensional image data.

13. A method according to claim 11, including continuously monitoring an angular position of the turntable to identify an object currently being scanned, and directing data from different objects to parallel data processing means associated with each object.

\* \* \* \* \*